United States Patent [19]

Craft

[11] Patent Number: 4,738,528
[45] Date of Patent: Apr. 19, 1988

[54] PYROMETER VORTEX PURGE AIR CLEANING SYSTEM WITH CENTER MASKED PYROMETER LENS

[75] Inventor: Donald W. Craft, Melrose, Mass.

[73] Assignee: General Electric Co., Wilmington, Mass.

[21] Appl. No.: 33,569

[22] Filed: Apr. 3, 1987

[51] Int. Cl.⁴ .............................................. G01J 5/08
[52] U.S. Cl. ..................................... 356/43; 350/582; 350/584; 374/125
[58] Field of Search ................ 350/582, 584; 374/125; 356/43, 44, 438, 439, 440, 442, 246

[56] References Cited

U.S. PATENT DOCUMENTS 4,374,620  2/1983  Berick et al. ...................... 356/246
4,443,072  4/1984  Ballard ............................... 350/584
4,521,088  6/1985  Masom ............................... 350/582
4,582,426  4/1986  Douglas ............................. 356/43

Primary Examiner—Davis L. Willis
Assistant Examiner—S. A. Turner
Attorney, Agent, or Firm—I. D. Blumenfeld

[57] ABSTRACT

Cleansing of a pyrometer lens is achieved by directing purge air spirally inward over the lens surface. The vortex formed by the spiral air flow is highly effective in removing contaminating matter from the lens surface. A light blocking or masking element is attached to the center of the lens where the purge air stagnates to prevent deposit of particles or other material on the center portion of the lens. This invention relates to a temperature sensing device and, more particularly, to an optical pyrometer and a method for effectively cleaning the same.

4 Claims, 3 Drawing Sheets

PYROMETER VORTEX PURGE AIR CLEANING SYSTEM WITH CENTER MASKED PYROMETER LENS

BACKGROUND OF THE INVENTION

Optical pyrometry is well known technology in which radiation from an object, such as a jet engine fan blade, the temperature of which is to be measured, is projected by a lens and an optical transmission means to sensors sensitive to a selected wave length or wave lengths. The intensity or relative intensities of the radiation in a selected portion or portions of the spectrum is a measure of the temperature of the radiation emitting object. Because the pyrometer lens is often exposed to extremely harsh environments, the lens is subject to contamination by materials such as soot particles engine oil, etc. Such contaminants interfere with proper operation of the pyrometer because the presence of contaminating materials reduces the intensity of the radiation passing through the lens and, more importantly, reduces the intensities by different amounts in different wave lengths. In a two-color pyrometer where the ratio of the emitted radiation in different wave lengths is measured serious measuring errors can result.

In an application Ser. No. 943,001 entitled "Vortex Purge Air Cleaning Optical Pyrometer Lens," filed Dec. 18, 1986 in the name of Donald William Craft, the inventor of the instant invention, which application is assigned to the General Electric Company, the assignee of the present invention, a lens cleaning arrangement is described in which the cleaning or purge air is caused to flow spirally inward over the surface of the lens.

The purge air thus forms a vortex which has been found to be remarkably effective in cleansing the surface of the lens. However, the swirl or vortex cleaning arrangement described in the above identified application has certain limitations. The inward flowing swirling purge air becomes static and thus forms a stagnation zone at some radius from the axis of symmetry and air flow over the surface is no longer spiral or vortex flow but becomes rigid body fluid flow which moves outward along the axis of symmetry. Within the stagnation zone contaminating particles are deposited on the lens. Attenuation of radiation transmitted through this varies in different portions of the radiation spectrum, and this differential attenuation can result in erroneous readings.

OBJECTIVE

It is therefore a principal objective of the instant invention to provide a high velocity purge air system for an optical pyrometer lens in which light transmission in the area of the lens near to or abutting the stagnant purge air zone is blocked.

Another objective of the instant invention is an optical pyrometer construction having a central light blocking element in the stagnant purge air zone.

Other objectives and advantages of the instant invention will become apparent as the description proceeds.

BRIEF DESCRIPTION OF THE INVENTION

The objectives and advantages of the instant invention are realized in an optical pyrometer in which purge air for cleaning the lens surface is introduced along the outer periphery of the lens. This results in swirling or vortex air flow over the surface. The tangential velocity of the swirling purge air increases as air flow moves inwardly due to conservation of angular momentum that must accompany such swirling of vortex air flow. A light blocking member is positioned over the center of the lens and has a diameter essentially the same as the diameter of stagnant air zone resulting from vortex flow. This prevents deposition of contaminants in the center portion of the lens where the vortex purge air flow is less effective in preventing deposition.

The novel features which are believed to be characteristic of this invention are set forth in the appended claims. The invention itself, however, both as to its organization and mode of operation together with certain objectives and advantages thereof, may best be understood by reference to the following description taken in connection with the accompanying drawings in which:

DETAILED DESCRIPTION OF THE PREFERRED EMBODIMENTS

Figure 1:
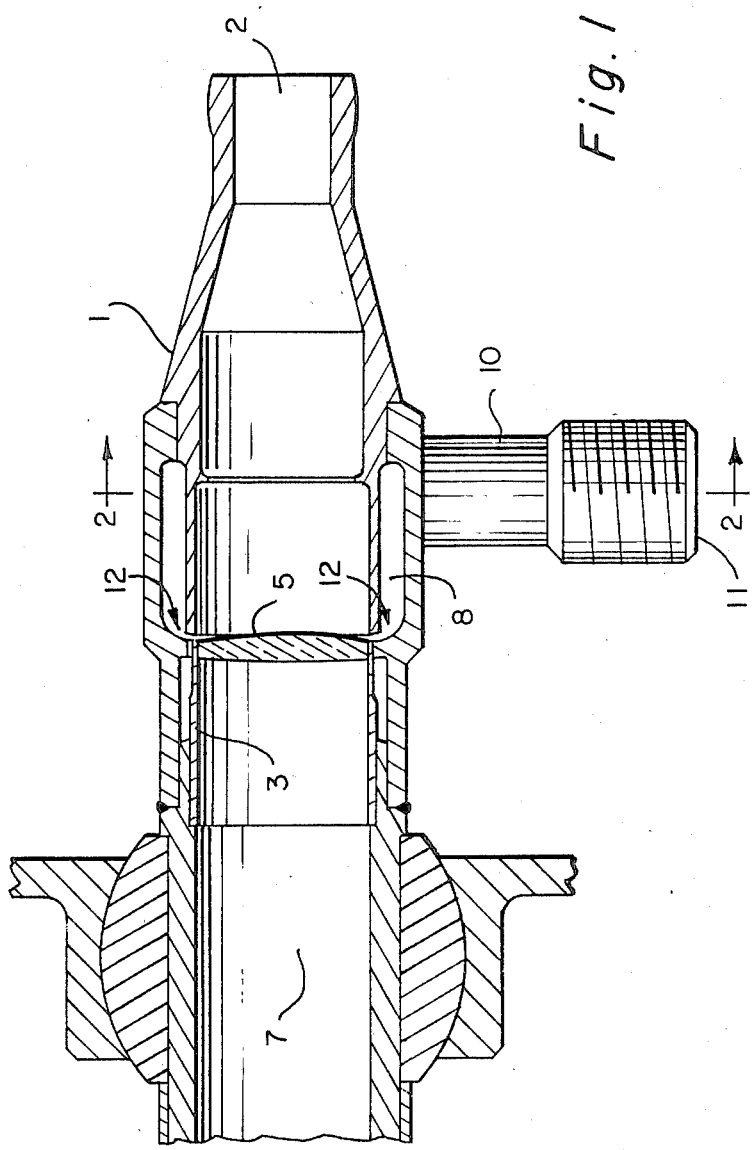
FIG. 1 is a sectional view of a pyrometer optical head showing the masked lens purge air arrangement.

FIG. 1 shows an optical pyrometer head incorporating the improved arrangement for purging the lens and masking the portion of the lens in the vicinity of the stagnant purge air zone. The optical head consists of a sight tube 1 having an opening 2 which is open to and directly views the object temperature of which is to be measured; i.e., an object such as the turbine blades of a jet engine. A lens tube 3 is secured to sight tube 1 and supports a lens 5 through which the radiation is projected. Lens 5 is attached to a cylindrical chamber 7 which may be filled with inert nitrogen. A radiation transmission means, not shown, is secured to the other end of chamber 7, and may typically consist of optical fibers which transmit the radiation to detectors such as IR and UV detectors which are located remotely from the optical head.

Figure 2:
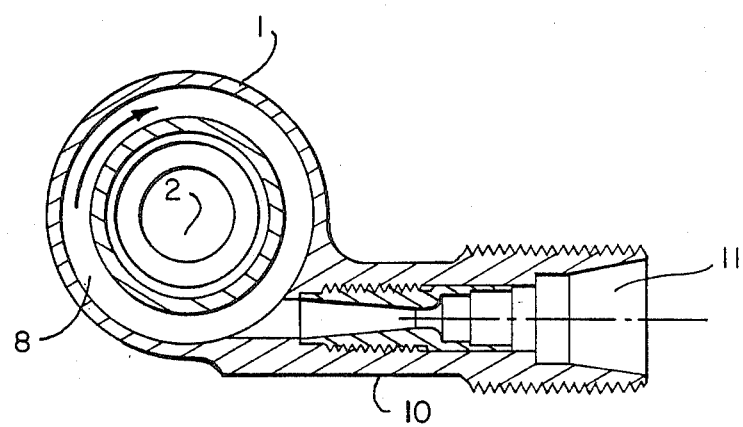
FIG. 2 is a sectional view taken along lines 2—2 of FIG. 1.

Surrounding lens tube 3 is an annular chamber 8 which communicates with inlet tube 10 through which purge or bleed air is introduced into the annular chamber. As may be seen most clearly in FIG. 2, inlet tube 10 communicates with annular chamber 8 through an inlet 11 which includes a restrictor portion to control the flow rate of the bleed air. The axis of inlet tube 10 is approximately tangent to the mean diameter of annular chamber 8, and chamber 8 thus acts as a manifold to distribute the purge air entering from inlet to produce uniform circumferential air flow in the annular chamber with the velocity of the air flow in annular chamber being related to the mean diameter of the annular chamber.

At one end of the annular chamber adjacent to the upper surface of lens 5 is an annular gap 12 which permits the air in the annular chamber gap to enter and be distributed over the surface of lens 5. As the air flows through annular chamber towards gap 12 located near the outer perimeter of the lens, the air flow has both an axial and a tangential velocity component.

The axial flow component in the annular chamber is determined from the mass flow rate of bleed air and the continuity equation. The tangential component of the velocity is determined from the velocity produced at the minimum area of the inlet and the changes in the velocity that occur between the inlet and the entrance to the annular chamber. This tangential component which is introduced at lens inlet 12 results in a swirling or vortex flow as the air passes through gap 12 near the outer perimeter of the lens. As the air enters annular gap 12, the axial velocity is turned 90° and accelerated to become a radial component. The tangential component in gap 12 will be slightly higher than the mean tangential velocity in annular chamber 8 because the radius in annular gap 12 is smaller than the mean radius of the annular chamber 8. That is, the flow in the tangential direction generally obeys the following equation which is based on the conservation of angular momentum.

$$V_t R = K_v \quad (1)$$

Where
($V_t$ = tangential velocity,
R = radius to the axis of symmetry, and,
$K_v$ = a constant for vortex flow.

It can be seen from Equation (1) that the radially inward velocity in the annular gap is greater than the radial velocity in the annular chamber.

The flow at the exit of annular gap 12 produces a free vortex flow with a superimposed radial or axial flow which forms near the surface of the lens. The tangential velocity of the air flow over the surface of the lens increases as the air flows towards the center of the lens due to the conservation of angular momentum. That is, as is clear from Equation 1, for a given constant Kv of vortex flow the tangential velocity must increase as the vortex radius decreases. By virtue of the increase in the velocity from the edge inward excellent cleansing of the lens surface from contaminated particles or liquids is achieved.

As the inward flowing, swirling air moves toward the center the purge air becomes static and moves axially outward along the axis of symmetry of sight tube 1. Thus, a purge air stagnation zone is present at some radius from the axis of symmetry where the air flow over the surface is no longer a spiral or vortex flow but becomes rigid body fluid flow which moves outward along the axis of symmetry.

In the purge air stagnation zone cleansing of the lens is much less effective than it is in the area of free swirling or vortex flow. While outward rigid body flow of the purge air in the stagnation zone will, to some extent, block contaminant deposition, it is not as effective as vortex purge flow. As a result, a contaminant layer is deposited at the center of the lens in the vicinity of the stagnation zone while an annular area of the lens surrounding the stagnation zone will be virtually completely clean. Radiation transmitted through the contaminant layer at the center of the lens is not only attenuated but the degree of attenuation varies with the wave length of the radiation. This introduces serious measuring errors, particularly in two color pyrometers in which the ratio of the intensity of the radiation in two different portions of the spectrum is a measure of the temperature of the emitting body.

Figure 3:
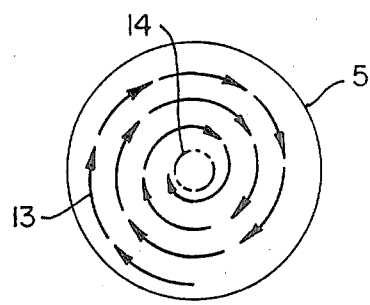
FIG. 3 is an elevational view of the objective lens showing the the flow path of the purge air.

FIG. 3 shows an elevation view of lens 5 and the vortex or swirling purge air flow over the surface. The vortex purge air flow is shown by means of the solid arrows 13 which flow from the outer periphery of the lens inwardly. It can be seen from these arrows that the radius of the air flow is reduced as it moves radially inward thereby resulting in the increased velocity flow as described. At some critical distance from the center of the lens vortex flow terminates and a stagnant air zone results which moves outward along the axis of symmetry of the housing. This axially outward air flow forces some of the incoming contaminated particles from the surface of the lens is not as effective in cleansing the center portion of the lens adjacent to the purge air stagnation zone.

In order to prevent deposition of a contaminant layer, a masking means is provided in the center lens area adjacent to the stagnation zone to block light transmission through the center of the lens. To this end, a circular light mask is attached to the center of the lens. The mask blocks all radiation through the center surface of the lens, so that contaminants deposited on the mask have no effect on the radiation detectors.

The masking material may be metallic and is brazed to a flattened roughened surface at the center of the lens. The brazing material should have a thermal coefficient of expansion which is the same as or very close to the thermal coefficient of expansion of the lens; i.e., the difference in thermal coefficient of expansion must be minimized. Preferably the brazing material is KOVAR which is a silver/copper eutectic commercially available from a variety of sources. Brazing of the mask to the lens and the mask is preferable by vacuum brazing in a hydrogen furnace.

Attaching a mask element to the glass surface by brazing is probably the preferred form of the invention, but the invention is by no means limited thereto. An alternative method of masking the center portion of the lens involves roughening the area to be masked by grinding or lapping and then coating the roughened surface with an oxidizable braze material.

Figure 4:
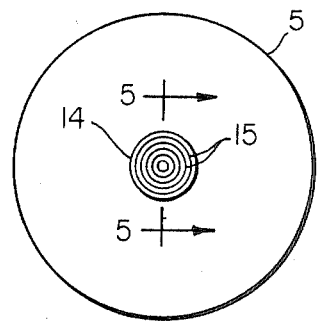
FIG. 4 is an elevational view of the lens and lens mask.

FIG. 4 shows an elevation view of lens 5 and a circular masking element 14 located in the center of the lens. Mask element 14 contains a plurality of grooves 15 to form an anti reflective serrated surface so that impinging radiation is reflected outwardly from the mask element.

Figure 5:
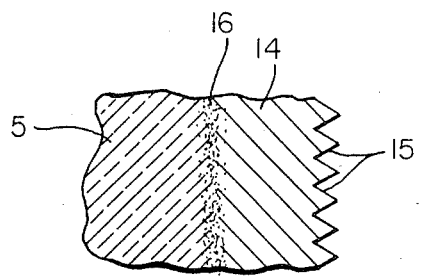
FIG. 5 is a partial sectional taken along the lines A—A of FIG. 4.

FIG. 5 which shows a partial sectional view through the mask and the lens and shows the lens and mask metal to glass seal in greater detail. Thus, as may be seen in FIG. 5 the adherence between the brazing layer 16 and the glass is enhanced by roughening the glass surface prior to brazing of the mask and KOVAR brazing layer 16 to lens 5. The outer surface of mask 14 contains a plurality of serrations 17 formed by scribing grooves 15 circularly around the mask element. Thus the circular grooves are concentric with the general circular shape of the mask and are inscribed at varying diameters from the surface of the mask thereby producing the serrations 17.

In order to evaluate the effectiveness of the lens cleaning arrangement utilizing swirling or vortex air flow over the surface of the pyrometer lens without the mask, the lens was subjected to a variety of contaminants. Initially a coating of used engine oil was spread over the surface of the lens. The contaminating oil layer was subject to 350° F. air flow for 30 minutes in an attempt to bake the oil on to the lens surface. Subsequently, the lens was purged by vortex air flow for a period of 5 minutes at 900° to 925° F. and at an inlet air pressure of 75 psi. After a five (5) minute purge the lens was found to be completely clear over an annulus surrounding a central portion of the lens. A small dot or black deposit appeared in the center of the lens with the size of the deposits being less than 0.03 inches in diameter.

Thereafter, a pyrometer head was subjected to five jet engine stalls to produce a soot layer over the surface of the lens. 150 psi inlet air at 0.01 lbs per second and 925° F. was introduced to the inlet producing a cleansing flow through the annular chamber of approximately 1220 fps and a vortex flow over the surface of the lens of approximately 310 fps. This resulted in rapid cleaning of the surface of the lens by removal of the soot and attesting of the light flux through the lens showed that the soot layer that remained at the center of the lens resulted in reduction in blocking of only 4% of the incident light.

However the contaminant layer in the center of the lens adjacent to the purge air stagnation zone even though resulting only in overall blockage of 4% of the light flux still results in differential attenuation in various parts of the spectrum and is therefore undesirable. By placing a masking element over the center of the lens this differential attenuation and the errors introduced thereby are completely eliminated.

The degree of blockage of the light flux due to the masking element is shown by a Table below which the degree of transmission is illustrated as a function of the ratio of the lens diameter to the mask diameter.

| Diameter Ratio = Mask Diam/Lens Diam | Effective Light X-mission of Lens (Percent %) |
| --- | --- |
| 0.1 | 99 |
| 0.2 | 96 |
| 0.3 | 91 |

It can be seen from the above Table that with a mask diameter which is two tenths (0.2) of the overall lens diameter only 4% of the light is blocked, the same amount blocked by a contaminant layer but without the differential attenuation over the spectrum produced by a contaminant layer. Furthermore, even with the mask diameter equal to 3/10 the (0.3) of the lens diameter less than 10% of the light flux is blocked.

It is thus apparent that a very effective method for cleansing the surface of a pyrometer lens subject to extremely harsh conditions which would normally result in the deposition of contaminants on the surface made possible by subjecting the surface of the lens to swirling or vortex air cleansing.

At the same time, deleterious effects due to contaminant deposition in the area adjacent to the stagnation zone of the purge air are eliminated by masking that portion of the lens without substantially affecting the overall magnitude of the transmission of the radiation.

While the instant invention has been described in connection with a preferred embodiment thereof, the invention is by no means limited thereto since other modifications of the instrumentalities employed may be made without going outside of the scope of the invention. It is contemplated by the appended claims to cover any such modifications that fall within the true scope and spirit of the invention.

What is claimed as new and desired to be secured by Letters Patent of the United States is:

1. A self-cleaning, pyrometer comprising:
   (a) A pyrometer housing having an open end exposed to a radiation emitting object the temperature of which is being measured,
   (b) A lens positioned in said housing for transmitting radiation from said object,
   (c) Means for continually cleaning the surface of said lens to remove contaminating material from the lens surface including,
   (d) Means for directing a vortex air over the surface of said lens, said vortex moving spirally inward from the outer edge of said lens towards a purge air stagnation zone located at the center,
   (e) Radiation blocking means at the center of said lens adjacent to the purge air stagnation zone near the center of the lens to prevent deposition of contaminants on said lens adjacent to the stagnation zone.

2. The self-cleaning pyrometer according to claim 1 wherein said radiation blocking means is attached to the center of the lens.

3. The self-cleaning pyrometer according to claim 2 including means for brazing said radiation blocking means to said lens.

4. The self-cleaning pyrometer according to claim 3 wherein the radiation blocking means surface facing the open end of said housing has a serrated, light reflecting surface.

* * * * *